Figure 1:
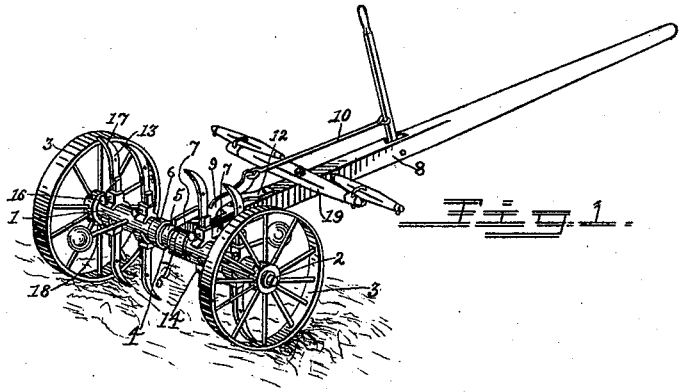

(No Model.)

H. C. MILBURN.
AGRICULTURAL IMPLEMENT.

No. 602,033. Patented Apr. 5, 1898.

WITNESSES

INVENTOR
Herschel Curry Milburn.
By
his Attorney

UNITED STATES PATENT OFFICE.

HERSCHEL C. MILBURN, OF WHITEVILLE, LOUISIANA.

AGRICULTURAL IMPLEMENT.

SPECIFICATION forming part of Letters Patent No. 602,033, dated April 5, 1898.

Application filed March 9, 1897. Serial No. 626,603. (No model.)

*To all whom it may concern:*

Be it known that I, HERSCHEL CURRY MILBURN, a citizen of the United States, residing at Whiteville, in St. Landry parish, State of Louisiana, have invented certain new and useful Improvements in Agricultural Implements; and I do hereby declare the following to be a full, clear, and exact description of the invention, such as will enable others skilled in the art to which it appertains to make and use the same.

This invention appertains to agricultural implements, and has special reference to the provision of a rake which is especially adapted for use in connection with removing peavines when the same are used as fodder, although not restricted to that use, as the same may be used wherever a rake is desired.

The invention consists in the novel features of construction and combination and arrangement of parts, as will be hereinafter more particularly pointed out in the claims and illustrated in the drawings hereto appended.

Figure 2:
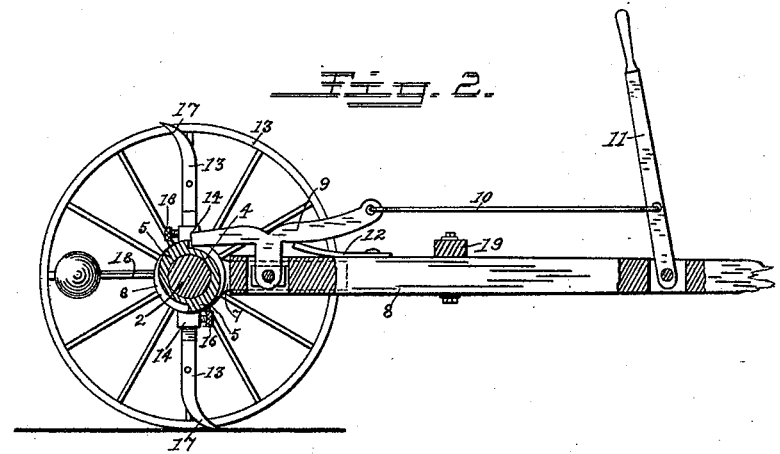
Figure 3:
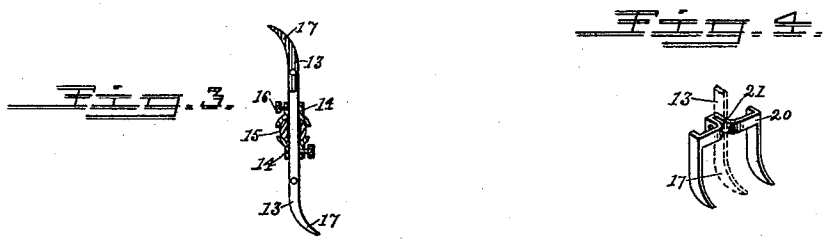
Figure 4:
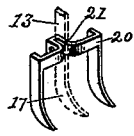

In the drawings, Figure 1 is a perspective view of my invention. Fig. 2 is a longitudinal sectional view through the tongue and axle. Fig. 3 is a section through the axle, showing the method of attaching the fingers of the rake thereto. Fig. 4 is a perspective view of an attachment for the rake.

Referring to the accompanying drawings, 1 indicates the axle, which constitutes the head of the rake. The ends of this axle are reduced to form the spindles 2, upon which the wheels 3 are adapted to rotate. The central portion of this axle is reduced, and secured to this reduced portion is a sectional collar 4. This collar 4 is formed with the shoulders 5, raised from opposite sides of its periphery and extending in opposite directions. The collars 6 are held upon the axle 1 to permit the rotation thereof and are provided with the securing-tongues 7, which extend on either side of the tongue 8 and are secured thereto by bolts. The inner end of this tongue 8 is recessed or slotted, and pivoted in this slot is the lever or dog 9, which is adapted at one end to engage the shoulders 5. The opposite end of this lever is connected by a link 10 to the vertical operating-lever 11, which is pivoted at its lower end in the tongue. A leaf-spring 12 is secured at one end upon the top of the tongue, and at its opposite end presses against the dog 9 and holds it in engagement with the shoulders 5.

13 designates the fingers of the rake, which extend through securing-collars 14 and slots 15 in the axle or head of the rake. The securing-collars 14 have the set-screws 16, which pass through the same and secure the fingers in their adjusted position. Each of these set-screws bears upon both of the teeth, passing through the collar in which the set-screw is held. It will be observed from Fig. 3 that the inner end of each finger extends entirely through the slot in the axle. This insures a rigid connection between the finger and the axle. The fingers are in line with the shoulders 5 and are bent at their extremities to form the curved portions 17 for passing under the vines and tearing the same loose from the earth. Projecting from opposite sides of the axle are the arms 18, which are weighted at their outer ends, said arms assisting in insuring the rotation of the brake. The doubletree 19 is pivoted to the top of the tongue in the usual manner, whereby the implement may be pulled by two horses, or, if the work is heavy, four horses can be added, as desired.

By reference to Fig. 5 it will be seen that I have produced an attachment for the rake which consists in a rectangularly-shaped frame 20, provided with the central bend 21, through which the set-screw passes, or a bolt for securing the same to the fingers. By attaching these additional fingers to the fingers of the rake a three-pronged rake is formed on each finger. In the position shown in Fig. 1 the rake is locked from rotation by the engagement of the dog with the shoulders of the collar 4, and in this position it is ready for use. When a large quantity of the vines has been collected by the rake, the operating-lever is pressed forward, releasing the dog from the shoulder of the collar 4, and the rake will assume the horizontal position, the weighted levers assisting in this movement. The rotation of the rake will be continued by the weight of the arms until the opposite shoulder comes in contact with the dog, when the rotation will be stopped and the rakes will again be in engagement with the vines to be pulled or removed from the soil.

From the above description it will be seen that I have produced a rake which may be lifted from engagement with the vines or other objects by the simple movement of the operating-lever, the weighted arms causing the rotation of the rake until it again comes in contact with the dog operated by the lever. It will also be observed that I have produced a simple attachment which may be positioned upon the fingers of the rake for making a three-pronged rake upon each finger. This rake is especially essential in the removal of pea-vines upon farms where the same are used as fodder, and is also very useful in removing potato-vines, and, in fact, is a most effective rake to be used in any capacity.

It will be understood that the adjustment of the fingers in the axle enables the same to be positioned close to or away from the surface of the ground.

Having thus described the invention, what is claimed as new is—

1. A rake comprising supporting-wheels, a head, fingers adjustable in said head, a tongue loosely mounted upon the head, and a means for locking the head with relation to the tongue to prevent its rotation, substantially as shown and described.

2. A rake comprising a head, supporting-wheels mounted upon the ends of said head, the head formed with vertical recesses, collars secured upon opposite sides of the head, fingers passing through the collars and the recesses of the head, a means for adjustably securing the fingers within the collars, a tongue loosely mounted upon the head, and a means for locking the head to the tongue and releasing the same therefrom, substantially as shown and described.

3. A rake comprising a head, supporting-wheels journaled upon each end of the same, a collar upon the central portion of the head, oppositely-extending shoulders upon the collar, a tongue loosely mounted upon the head, a dog pivoted in the tongue and adapted to engage the notches of the collar, an operating-lever, a link connecting the opposite end of the dog with the operating-lever, weighted arms for assisting in the rotation of the head when released by the dog, adjustable fingers secured to the head, and a means for holding the dog normally in engagement with the notches of the collar, substantially as shown and described.

4. A rake comprising a head, fingers adjustably secured in said head and curved at their opposite ends, a three-pronged attachment adapted to be secured to the fingers for converting the same into a three-pronged rake, supporting-wheels for the head, a tongue loosely mounted upon the head, and a means for locking the tongue and head or releasing the same, substantially as shown and described.

In testimony whereof I have signed this specification in the presence of two subscribing witnesses.

HERSCHEL C. MILBURN.

Witnesses:
LOYD SAVANT,
W. H. MILBURN.